US011664941B2

(12) United States Patent
Hassan et al.

(10) Patent No.: US 11,664,941 B2
(45) Date of Patent: May 30, 2023

(54) CHANNEL ESTIMATION AND CODING FOR THROUGHPUT INCREASE (71) Applicant: Microsoft Technology Licensing, LLC, Redmond, WA (US)

(72) Inventors: Amer Hassan, Kirkland, WA (US); Russell Andrew Penar, Highlands Ranch, CO (US); Edward Charles Giaimo, III, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 17/218,351

(22) Filed: Mar. 31, 2021

(65) Prior Publication Data

US 2022/0321283 A1    Oct. 6, 2022

(51) Int. Cl.
*H04L 1/22* (2006.01)
*H04L 1/00* (2006.01)
*H04L 1/08* (2006.01)
*H04L 25/02* (2006.01)
*H04L 43/0852* (2022.01)
*H04L 43/16* (2022.01)

(52) U.S. Cl.
CPC .............. *H04L 1/22* (2013.01); *H04L 1/0046* (2013.01); *H04L 1/0061* (2013.01); *H04L 1/08* (2013.01); *H04L 25/0202* (2013.01); *H04L 43/0852* (2013.01); *H04L 43/16* (2013.01)

(58) Field of Classification Search
CPC ....... H04L 1/22; H04L 1/0046; H04L 1/0061; H04L 43/0852; H04L 43/16
See application file for complete search history.

(56) References Cited

U.S. PATENT DOCUMENTS

| 2012/0084559 | A1* | 4/2012 | Bonicatto | H04L 1/0046 713/170 |
| 2015/0257141 | A1* | 9/2015 | Kulal | H04W 72/0406 370/329 |
| 2017/0041026 | A1* | 2/2017 | Hassan | H04L 1/0009 |
| 2018/0367245 | A1 | 12/2018 | Soriaga et al. | |
| 2019/0379485 | A1 | 12/2019 | Jiang et al. | |

OTHER PUBLICATIONS

"International Search Report and Written Opinion Issued in PCT Application No. PCT/US22/020283", dated Jun. 22, 2022, 10 Pages.
Yang, et al., "On Adaptive Hybrid Error Control in Wireless Networks Using Reed—Solomon Codes", In Journal of IEEE Transactions on Wireless Communications, vol. 4, Issue 3, May 1, 2005, pp. 835-840.

* cited by examiner

Primary Examiner — Jackie Zuniga Abad
(74) Attorney, Agent, or Firm — NovoTechIP International PLLC (57) ABSTRACT A system and method for data coding and transmission for improving a retry mechanism are disclosed. A system and method allow the receiver to perform decoding based on increased data bits rather than by repeatedly processing the same retransmitted information, thereby reducing the number of retries and improving the performance of a communication system. Also, with the reduced number of retries, the computing costs of the electronic devices used in the communication systems are reduced. When mobile devices are often used in wireless communication, this is particularly advantageous since the battery life of these devices is significantly improved. Moreover, the system and method provide incremental data transmission and therefore optimize the utilization of channel bandwidth.

20 Claims, 6 Drawing Sheets

CHANNEL ESTIMATION AND CODING FOR THROUGHPUT INCREASE

BACKGROUND

A typical wireless communication system has a set of modulation and coding schemes. A coding scheme is a procedure that controls the occurrences of errors. Since wireless communication systems usually suffer from severe channel impairments, the efficiency of the coding scheme significantly affects the reliability of the communication systems. A coding scheme is mainly selected based on the data transmission rate and data error rate. The data transmission rate relates to how fast a transmitter can transmit data while keeping the error rate below a particular level. Therefore, one aspect for improving the performance of the wireless communication systems is to develop a coding strategy that sustains higher data rates, thereby increasing the throughput of the communication systems. The data error rate measures errors that cannot be corrected. The un-correctable errors usually cause data retransmissions, which introduce latency and lead to poor end-user experience. Therefore, another aspect for improving the performance of the wireless communication systems is to develop a coding strategy that reduces the adverse effect of retransmissions.

Hence, there is a need for an efficient coding scheme that optimizes the rate of transmission while reducing the number of retransmissions.

SUMMARY

In one aspect, a system for data coding and transmission for improving retry mechanism includes a processor, and a memory, coupled to the processor, storing executable instructions. The instructions, when executed by the processor, cause the system to: code input data into a first bit set and a second bit set using one or more error control coding schemes, the first bit set including data bits that map to the input data and first redundant data bits, the second bit set including second redundant data bits, the first and second redundant data bits being generated based on the input data, wherein the input data is data needed to be transmitted to and recovered by a receiver, while the first redundant data bits and the second redundant data bits are extra data added for detecting or correcting errors when the receiver performs decoding to recover the needed data; transmit the first bit set through a communication channel to the receiver; determine whether the receiver can decode the first bit set to recover the input data based on an indication signal; responsive to determining that the receiver fails to decode the first bit set, identify a first portion of the second redundant data bits and transmit the first portion of the second redundant data bits through the communication channel to the receiver to cause the receiver to decode the first bit set and the first portion of the second redundant data bits to recover the input data.

The above general aspect may include one or more of the following features: determining whether the receiver can decode the first bit set and the first portion of the second redundant data bits, and responsive to determining that the receiver fails to decode the first bit set and the first portion of the second redundant data bits: identifying a second portion of the second redundant data bits, the second portion of the second redundant data bits being different from the first portion of the second redundant data bits, and transmitting the second portion of the second redundant data bits through the communication channel to the receiver to cause the receiver to decode the first bit set, the first portion of the second redundant data bits, and the second portion of the second redundant data bits to recover the input data; responsive to determining that the receiver can decode the first bit set and the first portion of the second redundant data bits: coding subsequent input data into a new first bit set and a new second bit set using the one or more error control coding schemes, the new first bit set including data bits that map to the subsequent input data and new first redundant data bits, the new second bit set including new second redundant data bits, and transmitting the new first bit set corresponding to the subsequent input data through the communication channel to the receiver; receiving the input data at a first encoder, constructing, by the first encoder, the first bit set by mapping the data bits of the input data and adding the first redundant data bits, the first redundant data bits being a first layer of protection data of the input data for error correction, outputting the first bit set to a second encoder, and constructing, by the second encoder, code data including the first bit set and the second bit set, the second redundant data in the second bit set being a second layer of protection data of the input data for error correction; receiving the input data at an encoder, constructing a bit stream at the encoder by mapping the data bits of the input data and adding redundant data bits, outputting the bit stream to a puncture, performing a puncturing operation on the bit stream to remove the second redundant data bits from the redundant data bits of the bit stream, and splitting the bit stream into the first bit set and the second bit set, wherein the second bit set includes the second redundant data bits and the first bit set includes a remaining portion of the bit stream, the remaining portion includes the data bits that map to the input data and the first redundant data bits; communicating with the receiver to determine whether the receiver fails to decode the first bit set to recover the input data, receiving a first retry request from the receiver when the receiver fails to decode the first bit set to recover the input data, in response to receiving the first retry request, transmitting the first portion of second redundant data bits to the receiver, and communicating with the receiver to determine whether the receiver fails to decode the first bit set and the first portion of second redundant data bits to recover the input data.

These general and specific aspects may be implemented using a system, a method, or a computer program, or any combination of systems, methods, and computer programs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The present disclosure relates to improving the performance of communication systems using a specific encoding mechanism. The technical solution presented herein addresses the technical problem of increasing channel efficiency while reducing transmission errors in a communication system. The technical solution first provides a feasible and efficient method to optimize the rate of transmission. When data can be transmitted over the communication channel at the optimized data rate, the technical solution designs an error coding mechanism that adds an additional layer of error control coding to the communication system to further enhance the performance of data communication through the communication channel.

First, based on the estimated channel capacity $\hat{C}$, the present disclosure identifies an optimized or maximum data transmission rate $r_{opt}$, for example, by finding the minimum $\Delta$ that maximizes $r=\hat{C}-\Delta$.

Once the $r_{opt}$ is determined, the data is coded and transmitted through a communication channel using the $r_{opt}$ rate. Traditionally, in forward error correction (FEC) coding, the input information i (e.g., four bits $i_1$, $i_2$, $i_3$ and $i_4$) is mapped to $c_1$, $c_2$, $c_3$ and $c_4$, and more bits are added to attach to $c_1$, $c_2$, $c_3$ and $c_4$ to protect the information data from errors. For example, the coded data is $C_1$ that includes $c_1$, $c_2$, $c_3$ through $c_{20}$, i.e., 20 bits. These 20 bits are transmitted to the receiver so that the receiver can recover the actual data $c_1$, $c_2$, $c_3$ and $c_4$. The receiver checks for errors. If there is an error, the receiver asks for retries. The sender uses the buffered data to transmit the 20 bits again. Sometimes, over wi-fi networks, these retries may happen 10-15 times or more.

Instead of using one FEC coding to add one layer of redundant bits to protect the data bits from retries and errors, the present disclosure provides a technical solution to add an additional layer of redundant bits. The technical solution generates coded data $[C_1, R_2]$, where $R_2$ includes a second layer of redundant bits. Still, $C_1$ is transmitted to the receiver. If an error happens in the receiver end, part of $R_2$, e.g., $R_{2\_1}$, will be sent to the receiver so that the receiver will decode $C_1+R_{2\_1}$. If still, $R_{2\_1}$ does not make decoding successful in the receiver, then $R_{2\_2}$ will be sent to the receiver so that the receiver can decode $C_1+R_{2\_1}+R_{2\_2}$, where $R_{2\_2}$ is another portion of $R_2$. Because the decoding is based on increased information, it is more powerful than processing only $C_1$, and thus reduces the number of retries.

In one implementation, $R_{2\_1}$ and $R_{2\_2}$ are selected based on channel conditions. If an error rate is high in the receiver side, $R_{2\_1}$ may be a significant portion of $R_2$. If after the decoding involving $R_{2\_1}$, the error rate is low, then $R_{2\_2}$ may be a small portion of $R_2$. This selection process is also related to delay restraints. Therefore, if audio data is being transmitted, which has low tolerance time, maybe only $R_{2\_1}$ and $R_{2\_2}$ are selected, and no $R_{2\_3}$ is selected and transmitted even if the receiver still cannot get the full correct data.

The determination about whether the receiver fails to decode the received data may be based on an indication signal from the receiver or an indication signal generated based on automatic channel detection of the transmitter. For example, an access point has a broadcast channel that transmits control messages. The transmitter can use these control messages to learn about the channel without the receiver sending the feedback. This technical solution addresses the problems of optimizing the rate of transmission while reducing the number of retries in communication systems, and therefore, improves the communication systems. Due to the reduced number of retries, the computing costs of the electronic devices used in the communication systems are also reduced. When the use of mobile devices becomes common in wireless communication, this is particularly advantageous since the battery life of these devices is significantly improved.

Figure 1:
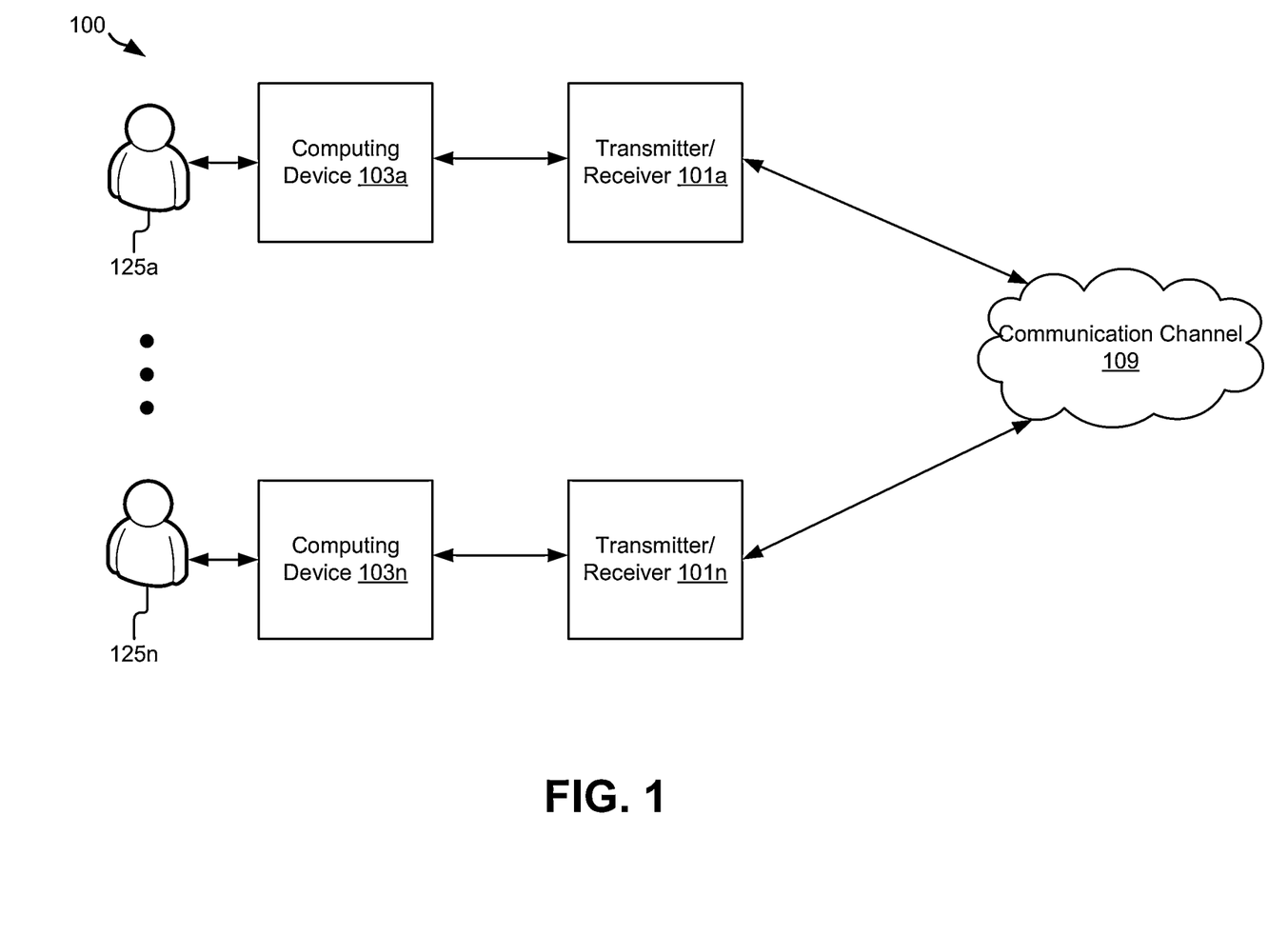
FIG. 1 is a block diagram of an example communication system.

FIG. 1 is a block diagram of an example communication system 100. As shown, the communication system 100 may include one or more computing devices 103a-103n coupled for electronic communication via one or more transmitters/receivers 101a-101n on a communication channel 109. It should be understood that the communication system 100 depicted in FIG. 1 is provided by way of example and the communication system 100 and/or further systems contemplated by this present disclosure may include additional and/or fewer components, may combine components and/or divide one or more of the components into additional components, etc. For example, the communication system 100 may include any number of computing devices 103a-103n or communication channels 109.

The computing devices 103a-103n (or collectively computing device 103) may include virtual or physical computer processors, memor(ies), communication interface(s)/device(s), etc., which, along with other components of the computing device 103, are coupled to the communication channel 109 for communication with other entities of the system 100. Non-limiting examples of the computing device 103 may include a laptop computer, a desktop computer, a tablet computer, a mobile telephone, a personal digital assistant (PDA), a mobile email device, or any other electronic devices capable of processing information and accessing the communication channel 109 via the communication components 101a-101n.

In one implementation, the computing device 103a-103n, accessed by users 125a-125n respectively, may send and receive data to and from other computing device(s) 103, and may further analyze and process the data. For example, when the user 125a interacts with user 125n in a communication session using an application such as Microsoft Teams® or Xbox® application, the computing device 103 associated with 125a/125n may provide various types of data such as audio data, video data or other types of multimedia data to another computing device 103 associated with 125n/125a. At any given point of time, one computing device 103 may act as a serving node to send data through a transmitter 101a-101n and the communication channel 109 to another computer device 103, while the other computing device 103 may act as a receiving node to receive the data through a receiver 101a-101n and the communication channel 109. Therefore, the transmitter/receiver 101a-101n will perform functionalities of either a transmitter 101 or a receiver 101 depending on a particular role that the associated computing device 103 plays in a particular data exchange transaction.

The communication channel 109 is a physical medium such as cables or space through which a signal or data packet is passed from a transmitter to a receiver. In one implementation, the communication channel 109 may be a wireless communication channel. For instance, the communication channel 109 may include one or more local area networks (LAN), wide area networks (WAN) (e.g., the Internet), public networks, private networks, virtual networks, mesh networks, peer-to-peer networks, and/or other interconnected data paths across which multiple devices may communicate. The communication channel 109 may also be coupled to or include portions of a telecommunications network for sending data in a variety of different communication protocols. In one implementation, the communication channel 109 includes Bluetooth® communication networks or a cellular communications network for sending and receiving data including via short messaging service (SMS), multimedia messaging service (MMS), hypertext transfer protocol (HTTP), direct data connection, WAP, email, etc. The communication channel 109 may also support various wireless standards such as global system for mobile communication (GSM), general packet radio service (GPRS), enhanced data GSM environment (EDGE), wideband CDMA (WCDMA), and others.

The transmitters/receivers 101a-101n (or collectively transmitter/receiver 101) perform the functionalities of sending, receiving, and processing data to enable data/information exchange between entities/computing devices 103 via the communication channel 109. The transmitter 101 may convert the input data, which is to be sent from one computing device 103a/103n to another computing device 103n/103a, into a form suitable for transmission through the communication channel 109. In one implementation, the transmitter 101 may include one or more of source encoder(s), channel encoder(s), encryptor(s), modulator(s), multiplexer(s), and other communication devices. For example, a source encoder may formulate the body of information or data message (e.g., text, sound, image) into a sequence of symbols or bits (e.g., code). An encryptor may secure the code to avoid access from an unauthorized entity. A channel encoder may process the data bits of the code to reduce bit errors through channel transmission. A modulator may superimpose the data bits on a high-frequency carrier wave for transmission through the communication channel 109.

When a transmitted signal or data code propagates along the communication channel 109, the signal or code may get distorted due to the channel attenuation, noise, interference, or other imperfections. As a result, the receiver 101 may receive a corrupted signal with errors. Therefore, the receiver 101 may perform operations to recover the correct input data from the received data bits of the code. In one implementation, the receiver 101 may include one or more of source decoder(s), channel decoder(s), decryptor(s), de-modulator(s), de-multiplexer(s), and other communication devices. The receiver 101 may operate in a way opposite to the transmitter to convert the received data signal back to the input data that is recognizable by the receiving computing device 103. Although the transmitter/receiver 101 may include multiple communication devices, mainly the communication components relevant to channel coding will be discussed in the description below and corresponding figures as a focus of the present disclosure.

Figure 2A:
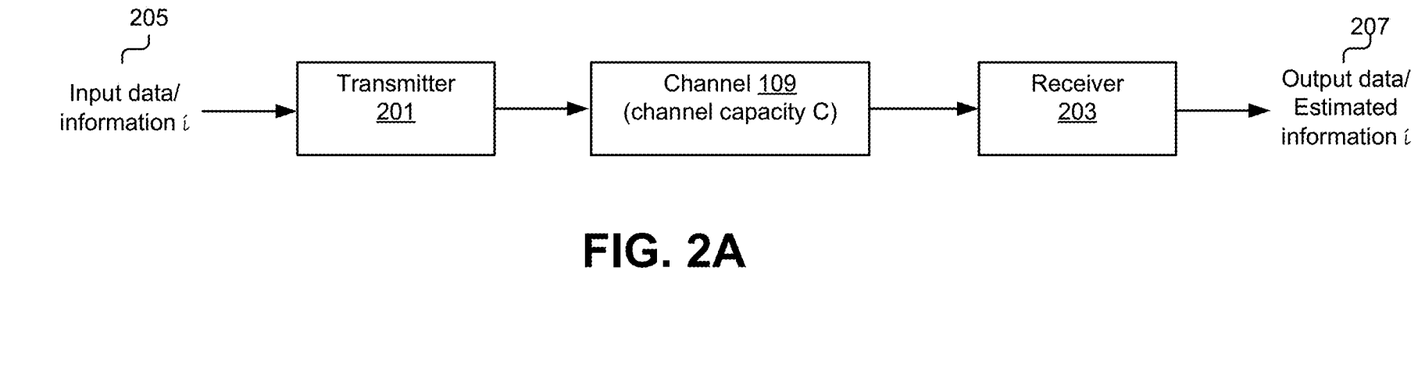
FIG. 2A is a block diagram of an example communication channel with a channel capacity in a communication system.

FIG. 2A is a block diagram of an example communication channel with a channel capacity in the communication system 100. As depicted, the communication system 100 includes a transmitter 201, a communication channel 109, and a receiver 203. The transmitter 201 may obtain input data from a computing device 103. For example, the user 125a wants to share a picture with the user 125n. The transmitter 201 coupled to the computing device 103a accessed by the user 125a may receive the image data associated with the picture as input data. The transmitter 201 sends the input data 205 through the communication channel 109 to the receiver 203. For example, the receiver 203 is connected to the computing device 103n accessed by the user 125n. Ideally, the receiver 203 would receive the same input data. For example, if four-bit information i=[$i_1$, $i_2$, $i_3$, $i_4$] was sent, the same four bits should be received by the receiver 203. However, no channel is noiseless. The communication channel 109 is also noisy. Due to the attenuation, distortion, or interference introduced in the communication channel 109 when the communication channel 109 conveys the input data 205, the receiver 203 will process the received data, and recover and output an estimated input data 207. The input data 205 and the estimated input data 207 may not be the same, i.e., error(s) may exist. An error rate measures the rate at which the errors occur, where an error is the receiving of a "1" bit when "0" bit was transmitted or the receiving of a "0" bit when "1" bit was transmitted. The error rate is related to the information/data transmission rate or data rate r, i.e., how fast the information is transmitted over the communication channel 109.

In information theory, the maximum rate at which data can be reliably transmitted over a given communication channel is defined as a channel capacity C. For example, according to Shannon's theorem, $$C = B \log_2\left(1 + \frac{S}{N}\right),$$

where C is the capacity in bits per second (e.g., bps), B is the available bandwidth, $$\frac{S}{N}$$

is signal-to-noise ratio SINK S is signal power, and N is noise power). Theoretically, if a transmitter can encode and transmit data at rate R using intelligent coding techniques and the rate R is less than C (i.e., R≤C), then an arbitrarily small error probability or error rate (i.e., maybe even error-free) can be achieved. On the other hand, if R>C, the errors cannot be avoided regardless of the coding technique being used. Therefore, to make as efficient use as possible of a given bandwidth of a channel, the goal is to get as high a data rate R as possible at a particular limit of the error rate for the given bandwidth.

In practical implementations, as R approaches C, it is harder to have a practical modulation and coding system that achieves reliable data transmission. The technical solution described herein provides an efficient method that allows the transmitter 201 to apply an intelligent algorithm (e.g., machine learning algorithm) to determine an optimized rate r that is as close as possible to an actual channel capacity $\acute{C}$. First, the transmitter 201 may estimate the actual channel capacity $\acute{C}$, for example, through a training sequence and feedback from the receiver. When a given bandwidth is allocated to the communication channel 109, the transmitter 201 may estimate the SNR and calculate the estimated capacity $\acute{C}$, e.g., using the Shannon formula shown above.

Once the estimated capacity $\acute{C}$ is determined, the transmitter 201 may determine an optimized or maximum data rate $r_{opt}$ based on adapting $r=\acute{C}-\Delta$ using a back-off parameter $\Delta$. The transmitter 201 increases the data rate r to $r_{opt}$ by decrementing $\Delta$ progressively until $\Delta$ approaches or converges to a limit $\varepsilon$, i.e., $\Delta\to\varepsilon$. The limit $\varepsilon$ shows a boundary value when the error rate of the received data becomes intolerable, e.g., when the transmission reliability is below a threshold.

In one implementation, the optimization starts with an initial $\Delta$. The transmitter 201 may send training data to the receiver 203 at the data rate $r=\acute{C}-\Delta$. An error rate resulted from receiving the data at $r=\acute{C}-\Delta$ is determined in the receiver. The transmitter 201 may apply an algorithm to determine a $\Delta_1$ (e.g., $\Delta_1=\frac{1}{2}\Delta$) based on this current error rate and adapt/update the initial $\Delta$ to $\Delta_1$. The training data is then transmitted to the receiver at $r_1=\acute{C}-\Delta_1$. If a new error rate determined from receiving the data at $r_1$ in the receiver 203 is still below a specified threshold, the transmitter 201 then determines a next $\Delta_2$. $\Delta_2$ is smaller than $\Delta_1$. The transmitter 201 determines the level that $\Delta_2$ is smaller than $\Delta_1$, for example, $\Delta_2=\frac{1}{2}\Delta_1$ or $\Delta_2=\frac{1}{4}\Delta_1$ based on the intelligent algorithm. The decrement of $\Delta$ may be linear or nonlinear. Once $\Delta_2$ is determined, the transmitter 201 may send the training data to the receiver 203 at the data rate $r_2=\acute{C}-\Delta_2$ and determine the next smaller $\Delta_3$. The process repeats until the new error rate determined based on $\Delta_k$ is no longer below the specified threshold. The back-off parameter is fixed at the last value $\Delta_{k-1}$ preceding $\Delta_k$ and the optimized data rate is $r_{opt}=\acute{C}-\Delta_{k-1}$. For example, if the previous error rate determined from receiving the data at $r_4=\acute{C}-\Delta_4$ is below the specified threshold, while the error rate determined from receiving the data at $r_5=C=\Delta_5$ exceeds the specified threshold, the transmitter 201 may determine that $r_{opt}=\acute{C}-\Delta_4$.

The transmitter 201 may fix the value of the back-off parameter at $\Delta_{k-1}$ until the next capacity estimation period. If the channel is fixed, the transmitter 201 may estimate the channel, i.e., estimating the SNR and calculating $\acute{C}$ less often and generate a longer estimation period. For example, the transmitter 201 may fix a value $\Delta_{k-1}$ once an hour. However, if the channel is not fixed, e.g., the sender is moving, the transmitter 201 may estimate the channel more often and fix the value $\Delta_{k-1}$ at a shorter estimation period, for example, once in seconds.

To improve the performance of the communication system 100, the technical solution first provides a feasible and efficient method to optimize the rate of transmission. When data can be transmitted over the communication channel 109 at the optimized data rate $r_{opt}$, the technical solution designs an error coding mechanism that adds an additional layer of error control coding to the communication system to further enhance the performance of data communication through the communication channel 109.

Figure 2B:
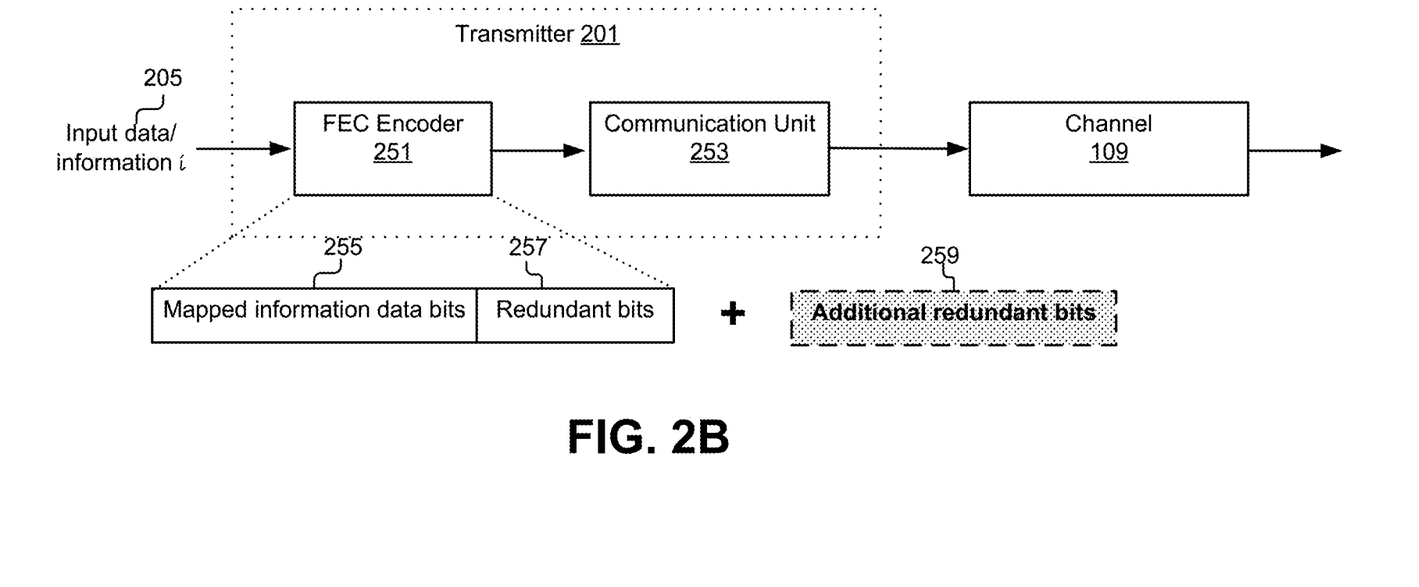
FIG. 2B is a block diagram illustrating an overview of an error control coding scheme implemented by a transmitter.

FIG. 2B is a block diagram illustrating an overview of an error control coding scheme implemented by a transmitter. In wireless communication, forward error correction (FEC) or channel coding is a technique used for controlling errors in data transmission over unreliable or noisy communication channels. FEC protects information bits against errors by adding and transmitting redundant bits. Therefore, if errors occur during the data transmission, a receiver can use the redundant bits to determine where the errors have occurred and how to correct them when decoding the data. As illustrated in FIG. 2B, responsive to receiving information data stream i, the FEC encoder 251 may output mapped information data bits 255 and redundant bits 257, and forward the outputted code data to be transmitted over the communication channel 109 through the communication unit 253 (e.g., including modulator, multiplexer, etc.). Suppose the information data stream includes four bits, i.e., $i=[i_1, i_2, i_3, i_4]$, the mapped information data bits 255 may include data bits $c_1$, $c_2$, $c_3$, and $c_4$ that respectively correspond to the four information bits $i_1$, $i_2$, $i_3$, and $i_4$. If only the data bits $c_1$, $c_2$, $c_3$, and $c_4$ are transmitted through the communication channel 109, the receiver 203 may not recover the valid information $i_1$, $i_2$, $i_3$, and $i_4$ if an error occurs in the data transmission. Therefore, the FEC encoder 251 adds the redundant bits 257, e.g., bits $c_5$-$c_{20}$, and transmits the total 20 bits $c_1$-$c_{20}$ to the receiver 203, so that the decoder of the receiver 203 may detect and correct the transmission errors.

FEC is designed to provide a receiver the ability to correct errors without the need for retransmission. In some situations (e.g., broadcast), the receiver may not have capability to request re-transmission. In other situations, the retransmission may induce significant latency. For example, a re-transmission because of decoding errors in satellite communications may cause a delay of several hours, However, FEC merely detects a limited number of errors that may occur anywhere in the received data, and the retransmission may still occur. In other words, the transmitter 201 passes the 20 bits $c_1$-$c_{20}$ to the communication channel 109 and the receiver 203 receives the $\check{c}_1$-$\check{c}_{20}$. If there is a difference between $c_1$-$c_{20}$ that was sent and $\check{c}_1$-$\check{c}_{20}$ that was received (i.e., error(s) exist), the receiver 203 may not decode the $\check{c}_1$-$\check{c}_{20}$ and recover the input data. Thus, the receiver 203 may send a request for a retry. In FEC, responsive to receiving the request, the transmitter 201 may retrieve the previously transmitted data $c_1$-$c_{20}$ from the buffered data and resend $c_1$-$c_{20}$ again and again until it was decoded by the receiver 203. Sometimes, over wi-fi networks, these retries may happen 6 times, 10 times, or 15 times, which is undesired.

As depicted in FIG. 2B, the technical solution described herein adds an additional layer of redundant bits 259, e.g., data bits $c_{21}$-$c_{50}$, to enhance the code data. As compared to the existing FEC, the coded data including the additional redundant bits 259 are stronger in the sense that it increases the maximum proportion of errors or missing bits that can be corrected in the receiver and thus reduces the number of retransmission or retries. FIG. 2B is depicted in a way to emphasize the new layer of redundant bits 259 in comparison to the existing FEC, but it does not mean the additional redundant bits are simply added or appended to the coded data from the existing FEC. The detail of the implementation of generating and transmitting the additional redundant bits will be described in FIGS. 3A, 3B, and 4.

Figure 3A:
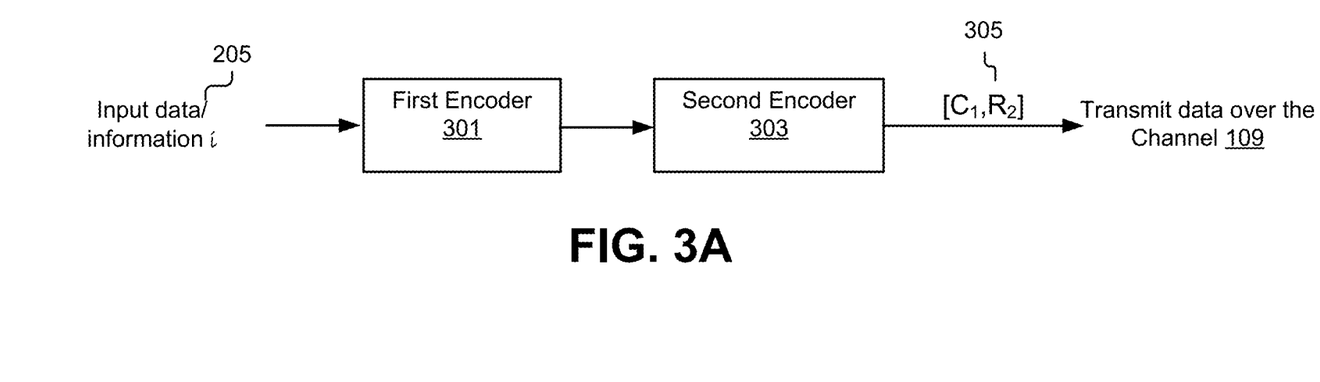
FIGS. 3A and 3B are block diagrams of example error control coding schemes according to the present disclosure.
Figure 3B:
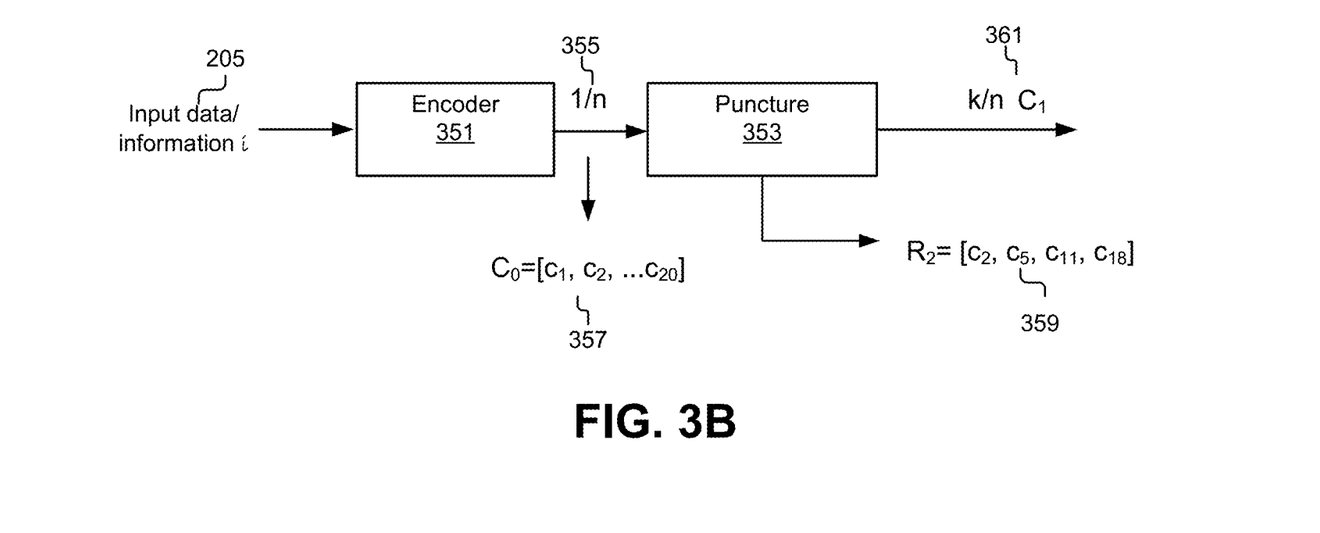

FIGS. 3A and 3B are block diagrams of example error control coding schemes according to the present disclosure. These figures illustrate how the input data 205 is coded by the codec(s) of the transmitter 201. In the first implementation shown in FIG. 3A, the transmitter 201 includes a first encoder 301 and a second encoder 303. The input data 205 is the information i that a sender (e.g., user 125a) wants the recipient (e.g., user 125n) to acquire. The input data 205 may be video, audio, text, or any other types of data streams that a computing device (e.g., 103a) associated with the sender provides to the first encoder 301. The first encoder 301 may convert the input data to the first code/symbol and output the first code to the second encoder 303. The second encoder 303 may act on the output of the first encoder 301 to generate the code 305.

In one implementation, the first encoder 301 is a FEC encoder such as a Reed-Solomon encoder, convolutional encoder, etc. Responsive to receiving the input information bits, e.g., $i=[i_1, i_2, i_3, i_4]$, the first encoder 301 maps the four information bits to $c_1, c_2, c_3$ and $c_4$, and adds more bits that attach to $c_1, c_2, c_3$ and $c_4$ to protect the information data from errors. For example, the first encoder 301 constructs a first bit set $C_1$ as output. The first bit set $C_1$ includes $c_1, c_2, c_3$ through $c_{10}$, i.e., 10 bits, where $c_1, c_2, c_3$ and $c_4$ are data bits that map to the message/information bits $i_1, i_2, i_3, i_4$, and $c_5$-$c_{10}$ are first redundant data bits in the set of $R_1$. The first redundant data bits in $R_1$ form a first layer of protection data of the input data $i_1, i_2, i_3, i_4$ for error correction.

The first bit set $C_1$ is output to the second encoder 303, and the second encoder 303 generates a second bit set $R_2$ including second redundant data bits. In one implementation, the second encoder 303 is an encoder performing systematic coding. The systematic coding maps the input information/message bits, which is $C_1$ with respect to the second encoder 303, without altering the message $C_1$, and adds second redundancy bits. Therefore, the output 305 of the second encoder 303 is a combined data bit set $[C_1, R_2]$, where $C_1$ includes the data bits $c_1$-$c_4$ that map to the input information bits $i_1$-$i_4$ and first redundant data bits $c_5$-$c_{10}$, and $R_2$ includes second redundant data bits, for example, $c_{11}$-$c_{20}$. The second redundant data bits in $R_2$ add more redundancy (e.g., additional 10 bits), and form a second layer of protection data of the input data $i_1, i_2, i_3, i_4$ for error correction.

In a preferred implementation, the second encoder 303 may generate the second redundant data bits in $R_2$ by performing a one-to-one mapping (i.e., a 1:1 function) of the data bits in $C_1$. For example, the second encoder 303 may determine that the first bit $c_{11}$ of $R_2$ is the XOR sum of the first bit $c_1$, third bit $c_3$, and ninth bit $c_9$ of $C_1$, the second bit $c_{12}$ of $R_2$ is the XOR sum of the first bit $c_1$, second bit $c_2$, fifth bit $c_5$, and eighth bit $c_8$ of $C_1$, and so on. The XOR sum is successive XOR operations on data bits.

It should be noted that the numbers of information bits and redundant bits described herein are merely for illustration purposes. A different number of redundant data bits, for example, 20 first redundant data bits and 30 second redundant data bits may be generated. The first encoder 301 and the second encoder 303 generate the first and second redundant data bits based on the input data 205. The input data or information bits i are data that needed to be transmitted to and recovered by the receiver 203, while the first redundant data bits $R_1$ and the second redundant data bits $R_2$ are extra data added for detecting or correcting errors when the receiver 203 performs decoding to recover the needed data.

Although the coded data $[C_1, R_2]$ is prepared, initially, the transmitter 201 sends only the data bits associated with the first bit set $C_1$ through the communication channel 109 to the receiver 203. The receiver 203 receives and decodes the data of the first bit set $C_1$. If the receiver 203 can decode the first bit set $C_1$ to recover the input data, the transmitter 201 moves to process subsequent input data. In other words, the first encoder 301 and the second encoder 303 may code the subsequent input data into a new first bit set $C'_1$ and a new second bit set $R'_2$, where the new first bit set $C'_1$ includes data bits that map to the subsequent input data and new first redundant data bits $R'_1$, and the new second bit set $R'_2$ includes new second redundant data bits. The transmitter 201 then transmits at least the new data bits of $C'_1$ through the communication channel 109 to the receiver 203. In one implementation, the decoding of the receiver 203 to recover the input data means that the receiver 203 can correctly decode the received code to obtain valid or meaningful input data in a noisy channel. In another implementation, the decoding means that the receiver 203 may reliably decode the received code to output the valid or meaningful input data with a high probability that exceeds a threshold probability. However, if the receiver 203 cannot decode the first bit set $C_1$ to recover the input data due to the errors of the received data, the transmitter 201 transmits at least partial data bits of $R_2$ to start a retry. In one implementation, the transmitter 201 may identify a first portion of the second redundant data bits in $R_2$ and transmit the first portion of the second redundant data bits through the communication channel 109 to the receiver 203. Upon the newly transmitted first portion of the second redundant data bits, the receiver 203 may decode the previously received first bit set $C_1$ and the new first portion of the second redundant data bits to recover the input data. Again, it is determined whether the receiver 203 can decode the first bit set $C_1$ and the first portion of the second redundant data bits. If there are still errors that prevent the receiver 203 from decoding and recovering the input data, the transmitter 201 may identify and transmit a second portion of the second redundant data bits to the receiver 203. The second portion of the second redundant data bits is different from the first portion of the second redundant data bits. The receiver 203 now may decode the first bit set received at the first data transmission, the first portion of the second redundant data bits received at the second data transmission, and the second portion of the second redundant data bits received at the current third data transmission to recover the input data. This retry process continues until the receiver 203 can successfully recover the input data or a specific condition is satisfied. The specific condition may include a delay constraint as described below.

At the first time before any retry, the transmitter 201 only transmits $C_1$, and the receiver 203 only processes or decodes $C_1$. If the received data is erroneous and a retry is required to recover the input message, some portions or even the entire $R_2$ is transmitted to the receiver 203. Therefore, at the second time, the receiver 203 decodes $C_1$ and a portion of $R_2$. At the third time, the receiver 203 decodes $C_1$, the portion of $R_2$ and another portion of $R_2$, and so on. The receiver 203 keeps processing more data bits. In contrast, the existing FEC retransmits $C_1$ again and again and expects the receiver can eventually process $C_1$ (e.g., the errors of the received $C_1$ may be reduced). However, sometimes re-transmitting $C_1$ cannot defeat the purpose since in some communication channels (e.g., Wi-Fi channel) the FEC may retransmit $C_1$ 10 times, 15 times, or even more times. As compared to the existing FEC, the technical solution allows the decoding based on increased data bits, which is more powerful than processing only $C_1$ and thus reduces the total number of retries. Additionally, the technical solution provides incremental data transmission and therefore optimizes the utilization of channel bandwidth. Each of $C_1$ and different portions of $R_2$ is transmitted once. Each retry is based on previously received data and a small portion of new data, which reduces the bandwidth cost used for repeatedly transmitting $C_1$ in the existing FEC.

A data retry is triggered when the communication channel 109 is noisy, i.e., in a bad channel condition, and the receiver 203 cannot decode the received data. In one implementation, the receiver 203 may send an indication signal (e.g., a retry request) to notify the transmitter 201 that the receiver 203 fails to decode the received data to recover the input information. In another implementation, the transmitter 201 may automatically detect a channel condition of the communication channel 109 and generate an indication signal based on the detection of the channel condition without feedback from the receiver 203. For example, the transmitter 201 may monitor the control message transmission on a broadcast channel associated with the communication channel 109 in wireless communication, and learn about the condition of the communication channel 109 based on the monitored control messages. If the transmitter 201 has difficulty in obtaining the control messages from the control channel, the transmitter 201 may determine that the communication channel 109 is noisy and the receiver 203 may not receive good-quality data bits to restore the correct input data. Therefore, the transmitter 201 can estimate the channel condition even if the receiver 203 does not request a retry. In such a case, the transmitter 201 may transmit data with more redundancy from $R_2$. As a result, there is not only a closed loop that the receiver 203 notifies the failure of decoding but also an open loop that the transmitter 201 automatically detects the channel condition, which improves the performance of the communication system by transmitting appropriate data bits without waiting for a time-out signal.

When the first data bit set $C_1$ is transmitted over the communication channel 109 and a data retry is triggered, the transmitter 201 transmits at least partial $R_2$. In one implementation, the transmitter 201 may determine a channel condition of the communication channel 109 and identify which portion of the second redundant data bits $R_2$ should be transmitted. The channel condition may include an error rate. The error rate measures the number of data bits received at the receiver 203 that have been altered due to noise, interference, distortion, or other errors of the communication channel 109. For example, the receiver 203 may determine an error rate based on cyclic redundancy code (CRC) checksum. The transmitter 201 may compare the determined error rate to at least one threshold error rate, and identify the first portion, the second portion, or other portions of $R_2$ based on whether the determined error rate exceeds the threshold error rate and/or a level of difference between the determined error rate and the threshold error rate. For example, if the error rate determined at the receiver 203 is well above a threshold error rate, the transmitter 203 may determine to transmit the whole $R_2$. If the error rate is above but close to the threshold error rate, the transmitter 203 may determine to transmit a small portion of $R_2$. If after the decoding involving the first portion of $R_2$, the error rate is lowered, then the transmitter 203 may determine the second portion of $R_2$ to be a portion of $R_2$ smaller than the first portion of $R_2$. Also, different thresholds or threshold error rates may be used to determine the portion(s) of $R_2$ to be transmitted. Therefore, if the first threshold is larger than the second threshold, the transmitter 201 may choose to transmit a larger portion of $R_2$ when the error rate in the receiver is above the first threshold than falling between the first and second thresholds.

In another implementation, to identify which portion of the second redundant data bits $R_2$ should be transmitted, the transmitter 201 may determine a delay constraint of the communication channel 109. The delay constraint includes a tolerance time. The tolerance time may be associated with a type of input data. For example, audio data may have a lower tolerance time than text data. A user cannot tolerate a long voice delay. The tolerance time may also be associated with a type of communication channel. For example, a satellite communication may have a higher tolerance time than a Wi-Fi communication. The transmitter 201 may identify one or more portions of the second redundant data bits $R_2$ that can be transmitted through the communication channel 109 within a tolerance time. In other words, the transmitter 201 identifies and transmits a new portion of $R_2$ until the tolerance time runs out or the receiver 203 can decode previously received bit sets combined with the new portion. For example, if audio data is being transmitted over the channel 109, maybe a first portion, a second portion and a third portion of $R_2$ need to be transmitted through the channel 109 for the receiver 203 to decode. However, only the first portion and the second portion but not the third portion of $R_2$ may be selected and transmitted before the tolerance time runs out even if the receiver 203 still cannot hear the full correct audio information.

FIG. 3B is an alternative or second implementation of error control coding schemes according to the present disclosure. The data transmission and retry process through the communication channel 109 to the receiver 203 shown in FIGS. 3A and 3B are the same, i.e., by initially transmitting $C_1$ and transmitting more and more bits of $R_2$ when data retry continues. However, as shown in FIG. 3B, the first bit set $C_1$ and second bit set $R_2$ are generated by an encoder 351 and a puncture 353. The encoder 351 (e.g., a FEC encoder) processes the input data to construct a data bit set or bit stream $C_0$ by mapping the data bits of the input data and adding redundant data bits. The output $C_0$ of the encoder 351 includes n times of the input information bits, that is, adding n−1 redundant bits to each input bit to output n bits, where n is an integer. This is shown as "1/n" in 355. To provide sufficient data for the subsequent processing of the puncture 353, the encoder 351 usually adds more redundancy to the data bits by selecting a larger number n and generating longer code bits (e.g., 50 bits) as opposed to the first encoder 301 shown in FIG. 3A. For clarity and simplicity, suppose for example output $C_0=[c_1, c_2, \ldots, c_{20}]$ in 357 is generated.

The long data bits included in $C_0$ are taken as the input of the puncture 353 to generate the first bit set $C_1$ and second bit set $R_2$. The puncture 353 is a communication unit for performing a puncturing operation. With the puncturing operation, the puncture 353 may remove some data bits, e.g., k bits, from the bit stream $C_0$. The puncture 353 may select the skipped k bits based on a puncturing pattern to keep the code distance of the remaining n−k bit stream. As a result, the puncture 353 splits the bit stream $c_1, c_2, \ldots, c_{20}$ into two streams. The k stream includes the removed or skipped k bits and the n−k stream includes the remaining n−k bits of the bit stream $C_0$. As shown in FIG. 3B, the puncture 353 outputs the k stream 359 as the second bit set $R_2$ and the n−k stream 361 as the first bit set $C_1$. The second bit set $R_2$ includes the second redundant data bits, and the first bit set $C_1$ includes the data bits that map to the input data and the first redundant data bits $R_1$. For example, when $C_0=[c_1, c_2, \ldots, c_{20}]$ is input into the puncture 353, the puncture 353 skips the k stream $[c_2, c_5 \ldots c_{11}, c_{18}]$ to form the second bit set $R_2$, while the remaining n−k stream $[c_1, c_3, c_4, c_6\text{-}c_{10}, c_{12}\text{-}c_{17}, c_{19}, c_{20}]$ becomes the first bit set $C_1$. As mentioned above, the data bits included in $C_1$ are the code transmitted to the receiver 203 when the data transmission starts. If $C_1$ is successfully decoded by the receiver 203, the transmitter 201 and the receiver 203 work together to transmit the next information bits. If, however, the received $C_1$ contains error(s) and cannot be successfully decoded by the receiver 203, at least part of $R_2$ is transmitted through the channel 109 so that the receiver 203 can decode the previously received $C_1$ along with the newly received data bits of $R_2$.

FIGS. 3A and 3B describe two different implementations of the error control code mechanisms by the transmitter 201. The approach shown in FIG. 3A may be implemented in the communication systems which have already adapted standard transmission protocols and cannot make significant changes to the system coding, while the approach shown in FIG. 3B may be applied to the communication systems which are more flexible and have more control on the system coding, for example, when designing coding scheme for a new product.

Figure 4:
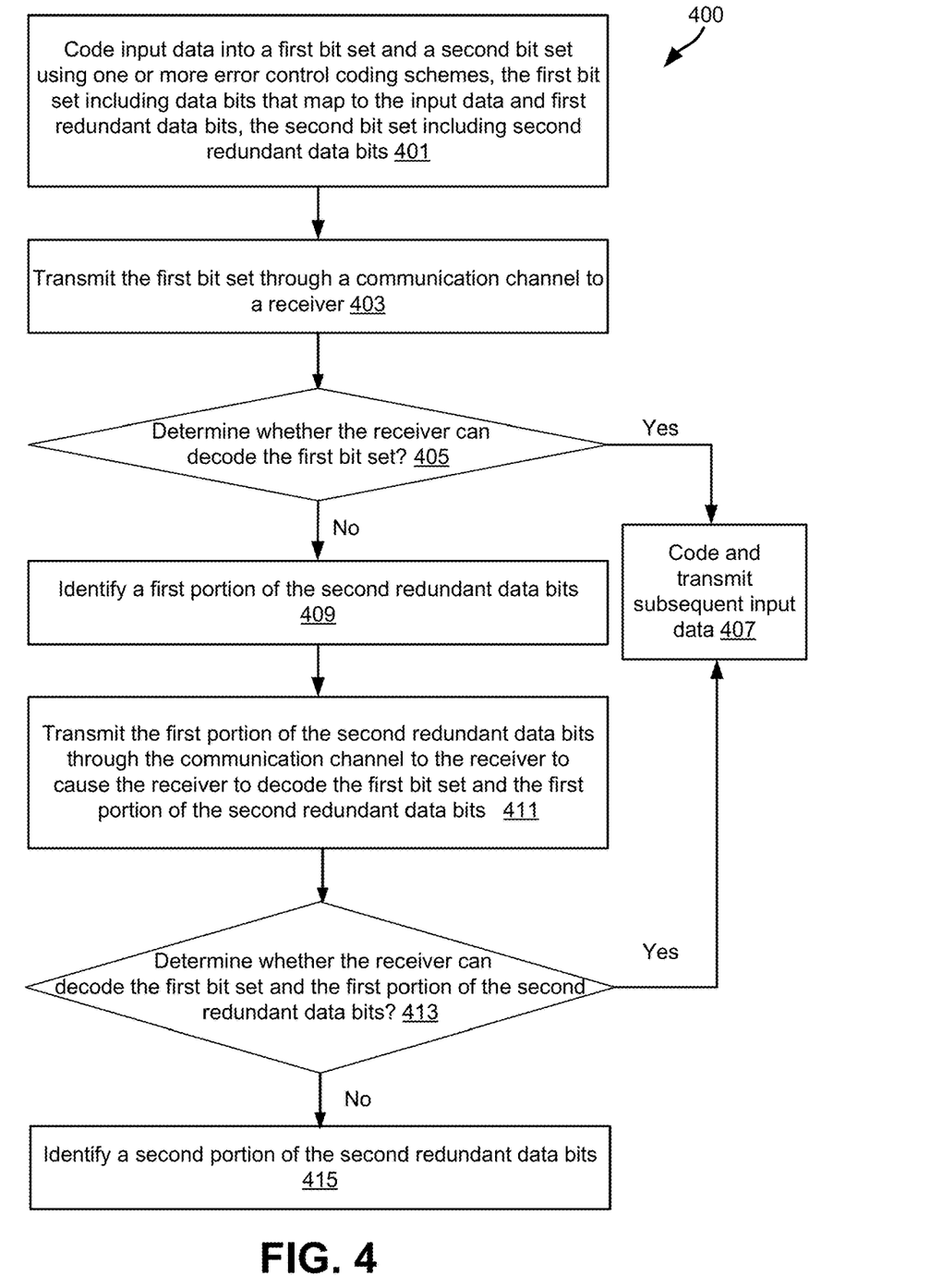
FIG. 4 is a flowchart of an example method for data coding and transmission for improving retry mechanism.

FIG. 4 is a flowchart of an example method 400 for data coding and transmission for improving the retry mechanism. The method is implemented by codec(s) of the transmitter 201 in communication with the receiver 203 over a communication channel 109. At block 401, the transmitter 201 codes input data into a first bit set $C_1$ and a second bit set $R_2$ using one or more error control coding schemes. The error control coding schemes may include FEC, puncture, etc. The first bit set $C_1$ includes data bits that map to the input data and first redundant data bits and the second bit set $R_2$ includes second redundant data bits. The first and second redundant data bits are generated based on the input data. The input data is data needed to be transmitted to and recovered by the receiver 203, while the first redundant data bits $R_1$ and the second redundant data bits $R_2$ are extra data added for detecting or correcting errors when the receiver 203 performs decoding to recover the needed data. At block 403, the transmitter 201 transmits the first bit set $C_1$ through a communication channel 109 to the receiver 203.

At block 405, the transmitter 201 determines whether the receiver 203 can decode the first bit set $C_1$ to recover the input data, for example, based on an indication signal from the receiver 203 or the transmitter 201. The indication signal from the receiver 203 may include a retry request. The indication signal from the transmitter 201 may be a detection result that the transmitter 203 automatically detects a channel condition of the communication channel 109 without feedback from the receiver 203. The detection result indicates that a result that the transmitter 201 automatically detects a channel condition of the communication channel without feedback from the receiver 203. If the receiver 203 can decode the first bit set $C_1$, at block 407, the transmitter 201 codes and transmits subsequent input data.

If the receiver 203 cannot decode the first bit set $C_1$, at block 409, the transmitter 201 identifies a first portion of the second redundant data bits $R_2$. At block 411, the transmitter 201 transmits the first portion of the second redundant data bits $R_2$ through the communication channel 109 to the receiver 203 to cause the receiver 203 to decode the first bit set $C_1$ and the first portion of the second redundant data bits $R_2$ to recover the input data. At block 413, the transmitter 201 determines whether the receiver 203 can decode the first bit set $C_1$ and the first portion of the second redundant data bits $R_2$. If the receiver 203 can decode the first bit set $C_1$ and the first portion of the second redundant data bits $R_2$, the method 400 proceeds to block 407, where the transmitter 201 codes and transmits the subsequent input data. However, if the receiver 203 cannot decode the first bit set $C_1$ and the first portion of the second redundant data bits $R_2$, at block 415, the transmitter 201 identifies a second portion of the second redundant data bits $R_2$. The second portion is different from the first portion. The retry continues until the receiver 203 can successfully recover the input data or a specific condition, for example, a delay constraint is satisfied.

Figure 5:
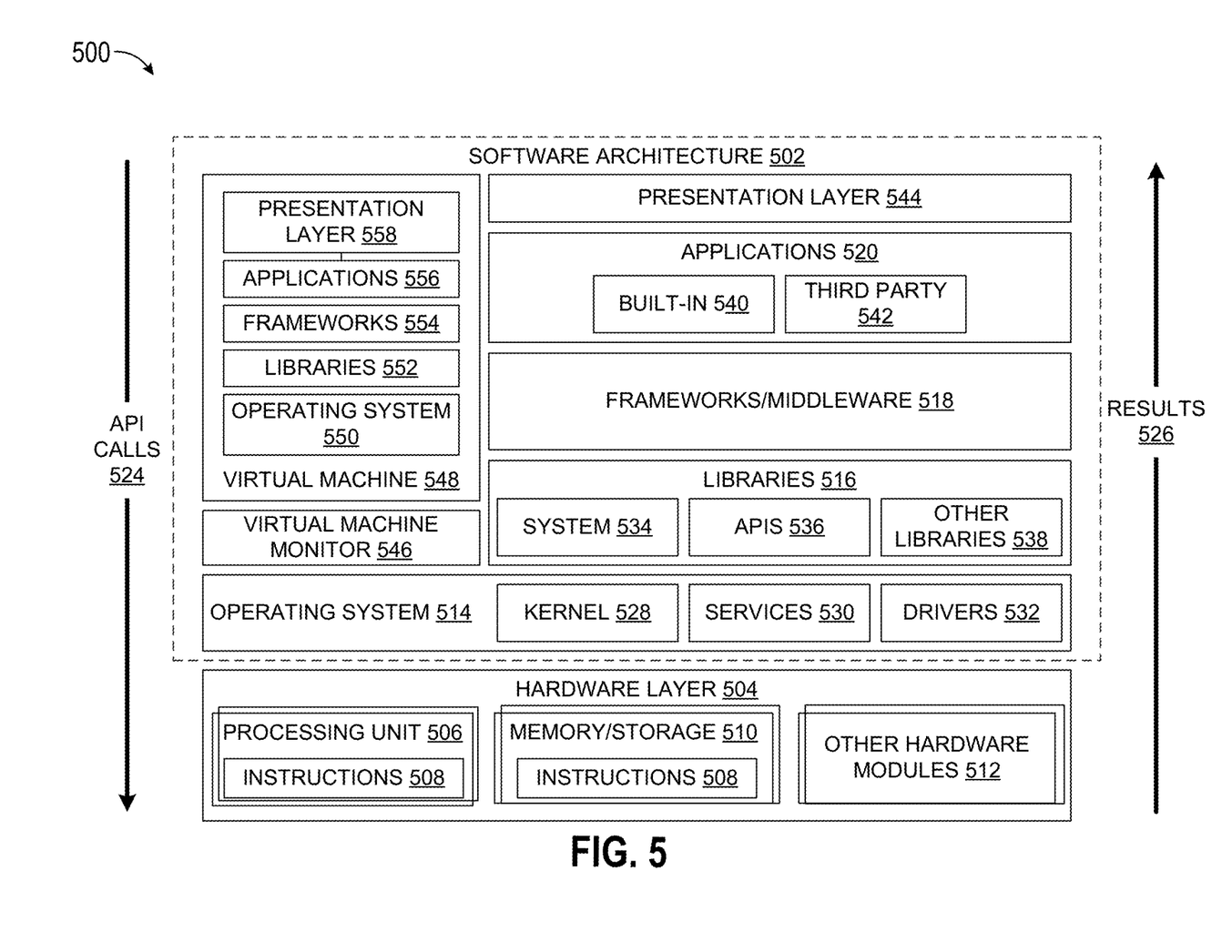
FIG. 5 is a block diagram illustrating an example software architecture.

FIG. 5 is a block diagram 500 illustrating an example software architecture 502, various portions of which may be used in conjunction with various hardware architectures herein described, which may implement any of the above-described features. FIG. 5 is a non-limiting example of software architecture and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
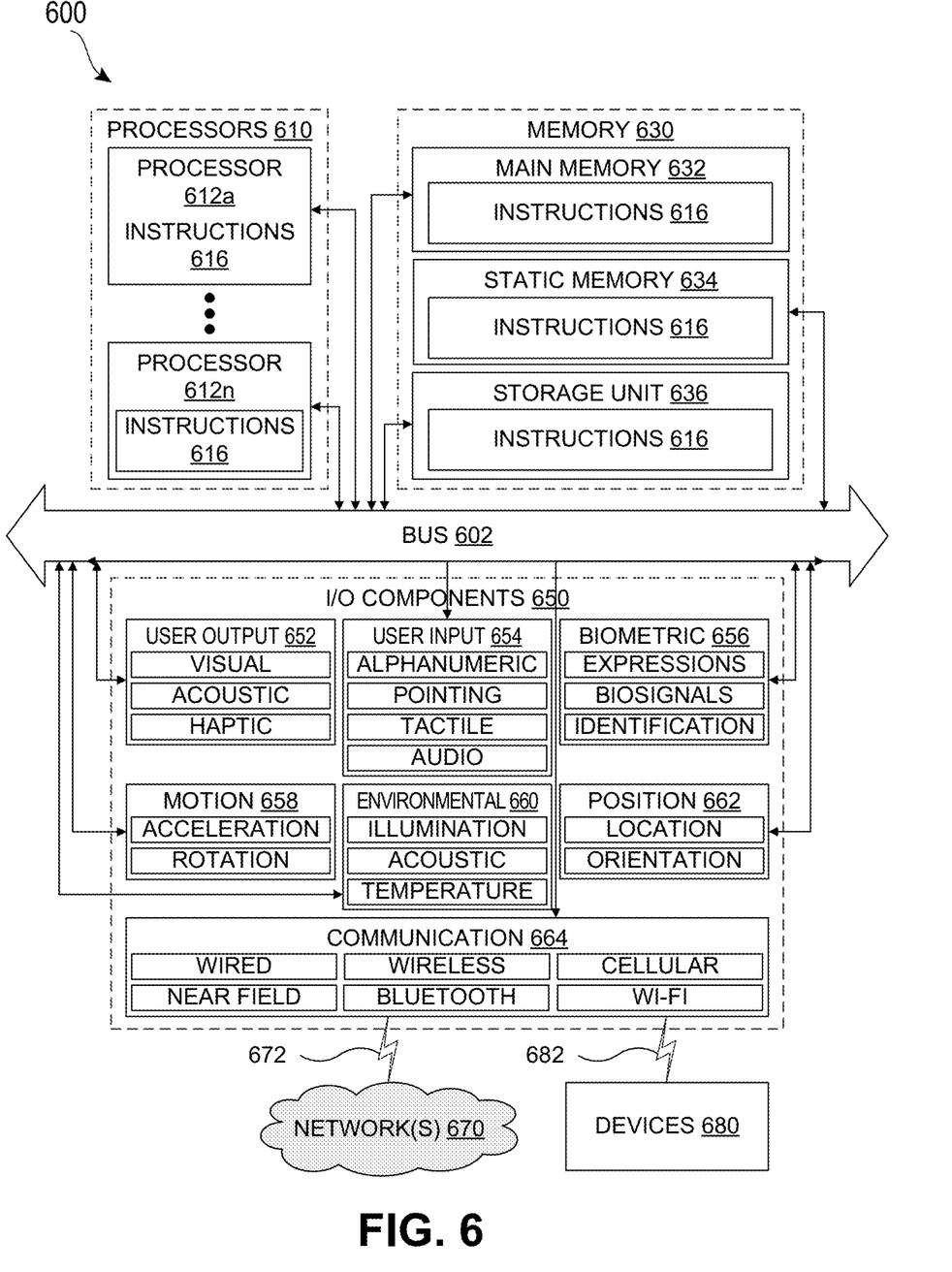
FIG. 6 is a block diagram illustrating components of an example machine configured to read instructions from a machine-readable medium.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612*a* to 612*n* that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other physical sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 658 may include, for example, acceleration sensors (for example, an accelerometer) and rotation sensors (for example, a gyroscope). The environmental components 660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 106, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for data coding and transmission for improving retry mechanism comprising:
 a processor; and
 a memory, coupled to the processor, configured to store executable instructions that, when executed by the processor, cause the system to:
  code input data into a first bit set using a first encoder using one or more error control coding schemes, the first bit set including data bits that map to the input data and first redundant data bits;
  output the first bit set to a second encoder or puncture;
  code a second bit set including the first bit set, and second redundant data bits using the second encoder or puncture, from the first bit set, the first and second redundant data bits being generated based on the input data, wherein the input data is data needed to be transmitted to and recovered by a receiver, while the first redundant data bits and the second redundant data bits are extra data added for detecting or correcting errors when the receiver performs decoding to recover the needed data;
  transmit the first bit set through a communication channel to the receiver;
  determine whether the receiver can decode the first bit set to recover the input data based on an indication signal; and
  responsive to determining that the receiver fails to decode the first bit set:
  identify a first portion of the second redundant data bits in the second bit set coded by the second encoder or puncture, which is less than all of the second redundant bits in the second bit set;
  transmit the first portion of the second redundant data bits through the communication channel to the receiver to cause the receiver to decode the first bit set and the first portion of the second redundant data bits to recover the input data;
  determine whether the receiver is able to decode the first bit set and the first portion of the second redundant data bits; and
  responsive to determining that the receiver fails to decode the first bit set and the first portion of the second redundant data bits:
   identify a second portion of the second redundant data bits in the second bit set coded by the second encoder or puncture, the second portion of the second redundant data bits being different from the first portion of the second redundant data bits; and
   transmit the second portion of the second redundant data bits through the communication channel to the receiver to cause the receiver to decode the first bit set, the first portion of the second redundant data bits, and the second portion of the second redundant data bits to recover the input data.

2. The system of claim 1, wherein the memory further stores executable instructions that, when executed by the processor, further cause the system to:
 determine whether the receiver can decode the first bit set and the first portion of the second redundant data bits; and
 responsive to determining that the receiver fails to decode the first bit set and the first portion of the second redundant data bits:
  identify a second portion of the second redundant data bits, the second portion of the second redundant data bits being different from the first portion of the second redundant data bits; and
  transmit the second portion of the second redundant data bits through the communication channel to the receiver to cause the receiver to decode the first bit set, the first portion of the second redundant data bits, and the second portion of the second redundant data bits to recover the input data.

3. The system of claim 1, wherein the memory further stores executable instructions that, when executed by the processor, cause the system to:
 responsive to determining that the receiver can decode the first bit set and the first portion of the second redundant data bits:
  code subsequent input data into a new first bit set and a new second bit set using the one or more error control coding schemes, the new first bit set including data bits that map to the subsequent input data and new first redundant data bits, the new second bit set including new second redundant data bits; and
  transmit the new first bit set corresponding to the subsequent input data through the communication channel to the receiver.

4. The system of claim 1, wherein to identify the first portion of the second redundant data bits, the memory further stores executable instructions that, when executed by the processor, cause the system to:
 determine a channel condition of the communication channel, the channel condition including an error rate;
 compare the determined error rate to a threshold error rate; and
 identify the first portion of the second redundant data bits based on whether the determined error rate exceeds the threshold error rate and a level of difference between the determined error rate and the threshold error rate.

5. The system of claim 1, wherein to identify the first portion of the second redundant data bits, the memory further stores executable instructions that, when executed by the processor, cause the system to:
- determine a delay constraint of the communication channel, the delay constraint including a tolerance time; and
- identify the first portion of the second redundant data bits that can be transmitted through the communication channel within the tolerance time.

6. The system of claim 5, wherein the memory further stores executable instructions that, when executed by the processor, cause the system to identify and transmit a new portion of the second redundant data bits through the communication channel to the receiver until the tolerance time runs out or the receiver can decode previously received bit sets combined with the new portion.

7. The system of claim 1, wherein the indication signal is a signal received from the receiver, the received signal including a retry request.

8. The system of claim 1, wherein the indication signal is a detection result from a transmitter automatically detecting a channel condition of the communication channel without feedback from the receiver.

9. The system of claim 1, wherein to code the input data into the first bit set and the second bit set, the memory further stores executable instructions that, when executed by the processor, cause the system to:
- receive the input data at a first encoder;
- construct, by the first encoder, the first bit set by mapping the data bits of the input data and adding the first redundant data bits, the first redundant data bits being a first layer of protection data of the input data for error correction;
- output the first bit set to a second encoder; and
- construct, by the second encoder, code data including the first bit set and the second bit set, the second redundant data in the second bit set being a second layer of protection data of the input data for error correction.

10. The system of claim 1, wherein to code the input data into the first bit set and the second bit set, the memory further stores executable instructions that, when executed by the processor, cause the system to:
- receive the input data at an encoder;
- construct a bit stream at the encoder by mapping the data bits of the input data and adding redundant data bits;
- output the bit stream to a puncture;
- perform a puncturing operation on the bit stream to remove the second redundant data bits from the redundant data bits of the bit stream; and
- split the bit stream into the first bit set and the second bit set, wherein the second bit set includes the second redundant data bits and the first bit set includes a remaining portion of the bit stream, the remaining portion includes the data bits that map to the input data and the first redundant data bits.

11. The system of claim 1, wherein the memory further stores executable instructions that, when executed by the processor, cause the system to determine an optimized data transmission rate.

12. The system of claim 1, wherein, responsive to transmitting the first bit set through the communication channel to the receiver, the memory further stores executable instructions that, when executed by the processor, cause the system to:
- communicate with the receiver to determine whether the receiver fails to decode the first bit set to recover the input data;
- receive a first retry request from the receiver when the receiver fails to decode the first bit set to recover the input data;
- in response to receiving the first retry request, transmit the first portion of second redundant data bits to the receiver; and
- communicate with the receiver to determine whether the receiver fails to decode the first bit set and the first portion of second redundant data bits to recover the input data.

13. A method for data coding and transmission for improving retry mechanism comprising:
- coding input data into a first bit set using a first encoder using one or more error control coding schemes, the first bit set including data bits that map to the input data and first redundant data bits,
- outputting the first bit set to a second encoder or puncture;
- coding a second bit set including the first bit set and second redundant data bits using the second encoder or puncture, from the first bit set, the first and second redundant data bits being generated based on the input data, wherein the input data is data needed to be transmitted to and recovered by a receiver, while the first redundant data bits and the second redundant data bits are extra data added for detecting or correcting errors when the receiver performs decoding to recover the needed data;
- transmitting the first bit set through a communication channel to the receiver;
- determining whether the receiver can decode the first bit set to recover the input data based on an indication signal;
- responsive to determining that the receiver fails to decode the first bit set:
  - identifying a first portion of the second redundant data bits in the second bit set coded by the second encoder or puncture, which is less than all of the second redundant bits in the second bit set;
  - transmitting the first portion of the second redundant data bits through the communication channel to the receiver to cause the receiver to decode the first bit set and the first portion of the second redundant data bits to recover the input data;
  - determining whether the receiver is able to decode the first bit set and the first portion of the second redundant data bits; and
  - responsive to determining that the receiver fails to decode the first bit set and the first portion of the second redundant data bits;
    - identifying a second portion of the second redundant data bits in the second bit set coded by the second encoder or puncture, the second portion of the second redundant data bits being different from the first portion of the second redundant data bits; and
    - transmitting the second portion of the second redundant data bits through the communication channel to the receiver to cause the receiver to decode the first bit set, the first portion of the second redundant data bits, and the second portion of the second redundant data bits to recover the input data.

14. The method of claim 13, further comprising:
- determining whether the receiver can decode the first bit set and the first portion of the second redundant data bits; and responsive to determining that the receiver fails to decode the first bit set and the first portion of the second redundant data bits:
   identifying a second portion of the second redundant data bits, the second portion of the second redundant data bits being different from the first portion of the second redundant data bits; and
   transmitting the second portion of the second redundant data bits through the communication channel to the receiver to cause the receiver to decode the first bit set, the first portion of the second redundant data bits, and the second portion of the second redundant data bits to recover the input data.

15. The method of claim 13, further comprising:
responsive to determining that the receiver can decode the first bit set and the first portion of the second redundant data bits:
   coding subsequent input data into a new first bit set and a new second bit set using the one or more error control coding schemes, the new first bit set including data bits that map to the subsequent input data and new first redundant data bits, the new second bit set including new second redundant data bits; and
   transmitting the new first bit set corresponding to the subsequent input data through the communication channel to the receiver.

16. The method of claim 13, wherein to identify the first portion of the second redundant data bits, the method further comprising:
   determining a channel condition of the communication channel, the channel condition including an error rate;
   comparing the determined error rate to a threshold error rate; and
   identifying the first portion of the second redundant data bits based on whether the determined error rate exceeds the threshold error rate and a level of difference between the determined error rate and the threshold error rate.

17. The method of claim 13, wherein to identify the first portion of the second redundant data bits, the method further comprising:
   determining a delay constraint of the communication channel, the delay constraint including a tolerance time associated with a type of the input data; and
   identifying the first portion of the second redundant data bits that can be transmitted through the communication channel within the tolerance time.

18. The method of claim 17, further comprising identifying and transmitting a new portion of the second redundant data bits through the communication channel to the receiver until the tolerance time runs out or the receiver can decode previously received bit sets combined with the new portion.

19. The method of claim 13, wherein to code the input data into the first bit set and the second bit set, the method further comprises:
   receiving the input data at the first encoder;
   constructing, by the first encoder, the first bit set by mapping the data bits of the input data and adding the first redundant data bits, the first redundant data bits being a first layer of protection data of the input data for error correction;
   outputting the first bit set to a second encoder; and
   constructing, by the second encoder, code data including the first bit set and the second bit set, the second redundant data in the second bit set being a second layer of protection data of the input data for error correction.

20. The method of claim 13, wherein to code the input data into the first bit set and the second bit set, the method further comprises:
   receiving the input data at the first encoder;
   constructing a bit stream at the encoder by mapping the data bits of the input data and adding redundant data bits;
   outputting the bit stream to a puncture;
   performing a puncturing operation on the bit stream to remove the second redundant data bits from the redundant data bits of the bit stream; and
   splitting the bit stream into the first bit set and the second bit set, wherein the second bit set includes the second redundant data bits and the first bit set includes a remaining portion of the bit stream, the remaining portion includes the data bits that map to the input data and the first redundant data bits.

* * * * *